United States Statutory Invention Registration [19]

[11] Reg. Number: H779

Verona [43] Published: May 1, 1990

[54] DAYTIME FLIGHT SYMBOLOGY DISPLAY SYSTEM

[76] Inventor: Robert W. Verona, 2801 Park Center Dr., Apt. #807, Alexandria, Va. 22302

[21] Appl. No.: 265,450

[22] Filed: Nov. 1, 1988

[51] Int. Cl.[5] ..... G02B 27/14; G09G 3/02
[52] U.S. Cl. ..... 350/174; 340/705
[58] Field of Search ..... 350/174, 166; 340/705

[56] References Cited

U.S. PATENT DOCUMENTS

| | | | |
|---|---|---|---|
| 3,230,819 | 1/1966 | Noxon | 350/174 |
| 3,614,314 | 10/1971 | Rossire | 350/174 |
| 3,748,016 | 7/1973 | Rossire | 350/174 |
| 3,887,273 | 6/1975 | Griffiths | 350/174 |
| 4,269,476 | 5/1981 | Gauthier et al. | 350/174 |
| 4,439,157 | 3/1984 | Breglia et al. | 350/174 |
| 4,647,967 | 3/1987 | Kirschner et al. | 350/174 |
| 4,652,870 | 3/1987 | Steward | 350/174 |
| 4,722,601 | 2/1988 | McFarlane | 350/174 |
| 4,735,473 | 4/1988 | Migozzi et al. | 350/174 |

FOREIGN PATENT DOCUMENTS

| | | | |
|---|---|---|---|
| 50239 | 3/1987 | Japan | 350/174 |

*Primary Examiner*—Thomas H. Tarcza
*Assistant Examiner*—Linda J. Wallace

[57] ABSTRACT

A miniature daytime dynamic alphanumeric/graphic flight symbology generator and display system in which raw aircraft data, such as altitude, airspeed, heading etc., are generated by a display generator into symbology indicating the data intensity. The symbology is transmitted by a signal transmission means, to a symbology image source by a means such as fiber optic links in case of optical signals or flexible cable in case of electrical signals. The symbology from the image source is projected onto a combiner directly in the line of sight of the aviator so that symbology indicating the various conditions of the aircraft is viewed by the aviator as an overlay with the actual scene. The combiner is enlarged to provide a 30° field of view and has a spectral coating thereon to enhance the symbology for daytime viewing. The display generator has a variable control means to increase the data intensity for daytime viewing.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DAYTIME FLIGHT SYMBOLOGY DISPLAY SYSTEM

The invention described herein may be manufactured, used, and licensed by the U.S. Government for governmental purposes without the payment of any royalties thereon.

BACKGROUND OF INVENTION

The present invention is in the field of generating aircraft condition symbology for military aviators heads up displays (HUDs). At the present, a U.S. Army HUD symbology generator exists for night time symbology display. However, there is also a need that daytime capable symbology be displayed in the direct line of sight of an aviator.

SUMMARY OF THE INVENTION

The present invention answers that need by providing a miniature daytime flight symbology generator system in which raw aircraft data is dynamically displayed in the direct line of sight of the aviator as daylight readable symbology. Three modifications in the night-time symbology generator provide a workable daytime symbology generator system. One of these modifications is a means for increasing the output signal levels generated in a display generator from the raw aircraft data inputs. The raw aircraft data may be information such as attitude, airspeed, heading, torque, fuel levels, etc. The increased output signal levels will in turn generate dynamic symbology that is increased in intensity accordingly. The symbology is transmitted to a symbology image source by a signal transmission means, such as a coherent fiber optic bundle for optical signals from the display generator of flexible cable for electrical signals. The symbology image source may be a miniature cathode ray tube (CRT), a liquid crystal or light emitting diode display. A current day system uses simply a lamp which projects through a reticle static pattern from the combiner into the eye. It does not have a dynamic alphanumeric or graphic capability. The electro-optical provides the enhanced dynamic alphanumeric and graph capabilities.

Two modifications are made in a beam combiner positioned in the line of sight of the aviator. First, the combiner housing and combiner mirror are increased in size to provide the necessary field of view for daytime use. With the enlarged combiner positioned at a 45° angle with respect to the output beam inpinging thereon from the symbology image source and to the eye of the aviator the necessary 30° field of view is provided. The combiner is also provided with a spectral coating to enhance daylight viewing.

DETAILED DESCRIPTION OF THE PREFERRED EMBODIMENT

Figure 1:
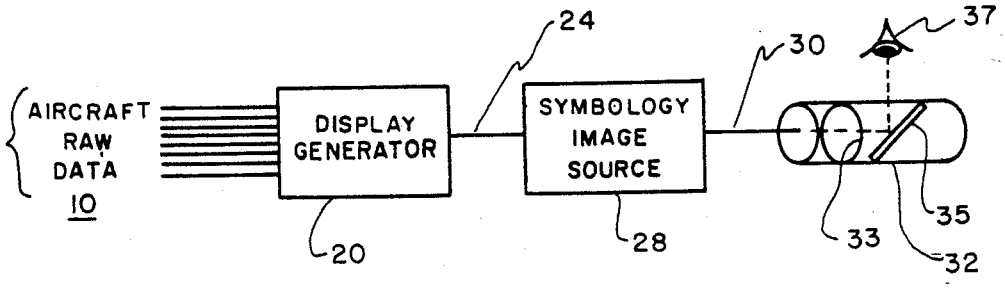
FIG. 1 is an in line schematic diagram of the present symbology generator system.

Refer not to FIG. 1 for an explanation of the present daytime flight symbology generator system which produces aircraft condition symbology with high enough luminance and spectral characteristics for a daytime heads up display. The aircraft raw data 10, such as mentioned herein above, is applied as various inputs to a display generator 20. Generator 20 generates symbology for each of the aircraft data and has output signals therefrom representing each set of data. The signals from 20 may be optical or electrical which are supplied to a symbology image source by a signal transmission means 24. Means 24 may be a coherent fiber optics bundle in the case of optical output signals or a flexible electrical cable in the case of electrical output signals. Source 28 is chosen according to the type signals from 20 but may be a cathode ray tube if the signals from 20 are electrical signals. Alternatively, 28 may be liquid crystal display (LCD), light emitting diode (LED), electro florescent (EL) or vacuum florescent (VFD). Any of these displays are aligned with the output end of the coherent fiber optics to project the image of optical signals 30 through focussing optics 33 and reflect off a partially reflecting mirror 35, known in the art as a combiner, into the line of sight of an aviator's eye 37. Optics 33 and combiner 35 may be rigidly held in a combiner housing 32. Generator 20 preferably has a variable output signal control means for selectively increasing the intensity of the output signal during daytime operation and decreasing during nighttime operation.

Figure 2:
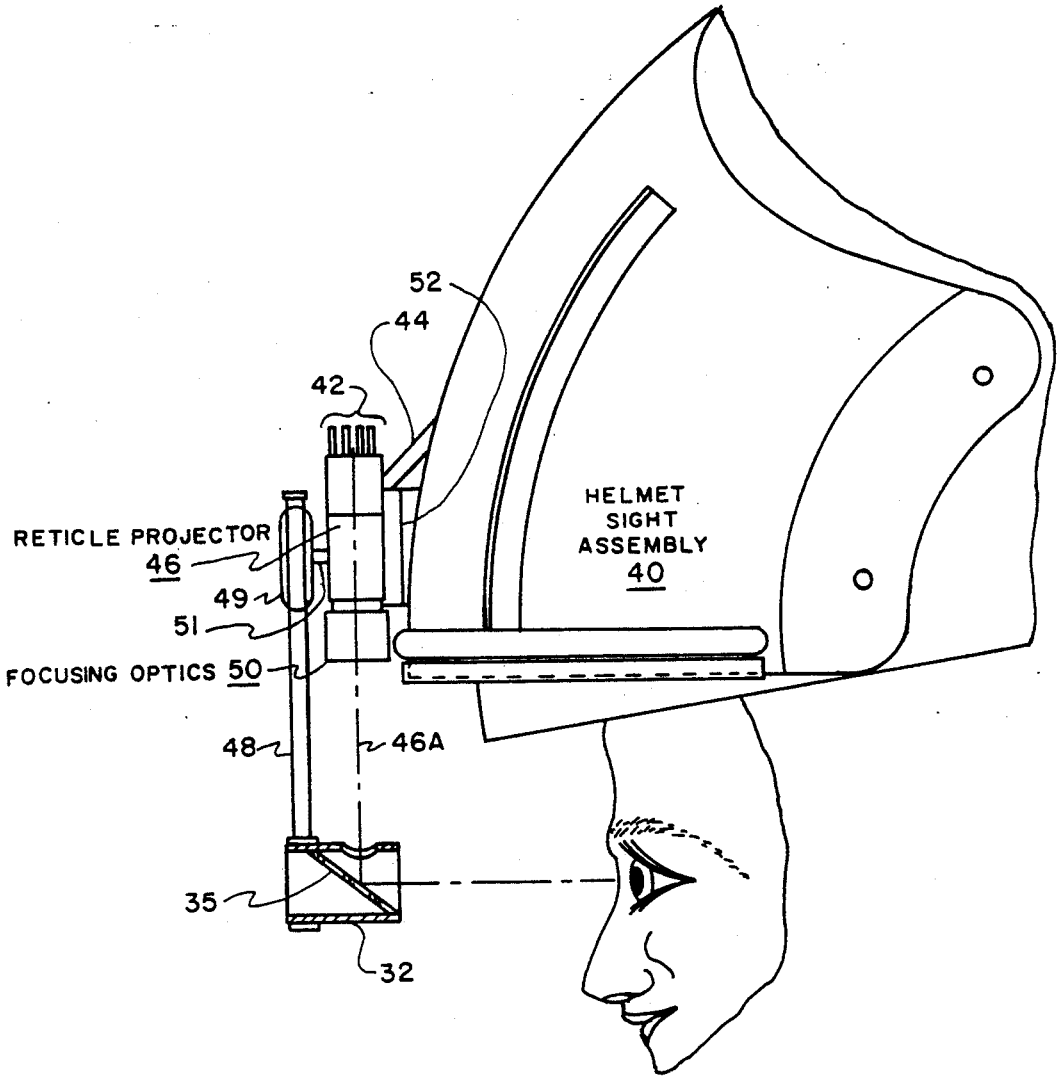
FIG. 2 illustrates a helmet heads up display means for the symbology generator system.

FIG. 2 illustrates one embodiment of the present system as mounted on a helmet sight assembly 40. It is noted that the display generator 20 and inputs 10 thereto are not shown but may be mounted on the same helmet (not shown either) upon which assembly 40 is attached. In this embodiment, source 28 is in the form of a reticle projector 46, Projector 46 may be screw threadably attached to 40 through a mount 52. Projector 46 is shown as having two types of signal inputs. One input is by fiber optics 42 and the other is by electrical cable 44, either or both which may be used. In this instance, the explanation will assume an optical input into 46 from the output end of 42. The output end of 42 will be imaged on a reticle pattern within 46. Projector 46 may have a display that projects the fiber optical output image and recticle pattern through focussing optics 50 as beam 46A onto combiner 35 for display thereon directly in the line of sight of the aviator. The combiner housing 32 is attached to one end of combiner arm 48 with the other end of arm 48 held by a friction clip 49. The pilot can easily see the overlay of the symbology from 46 on combiner 35 in his direct line of sight.

As mentioned above the housing 32 and combiner mirror 35 are of such size as to present a 30° field of view, which is generally 50% larger than what is required for night vision observance. Housing 32 is easily adjustable to the level of the aviator's eye 37 by movement of arm 48 through friction clip 49 and then releasing clip 49 to lock 48 in place. Arm 48 is also rotatable to the side of the head in a stow position about a stem 51 connected to 46. There may be one set of 35 and 46 for each eye. Alternatively, the projector 46 may also be side mounted with the combiner 35 and arm 48 rotatable to the forehead stow position.

I claim:

1. A miniature dynamic alphanumeric and graphic flight symbology generator system for use in a heads up helmet mounted display daytime environment, said system comprising:

a display generator having various inputs thereto from raw aircraft data and internal signal generating means providing various output signals therefrom in direct relationship to the aircraft data and variable signal control means to increase the value of said output signals during the daytime to provide daytime observance of the symbology generated;

a symbology image source which has a luminance in direct relation to said output signals applied as inputs thereto through a signal transmission means from said display generator to said symbology image source; and a beam combiner means positioned in the line of sight of at least one eye of an aviator, said beam combiner means comprised of focussing optics and a mirror positioned at an angle to reflect the display on said symbology image source directly back into the eye of the pilot wherein said mirror has a spectral coating thereon for enhancing the image for daytime viewing.

2. The system as set forth in claim 1 wherein said symbology image source is a miniature cathode ray tube and said signal transmission means is a flexible cable interfacing with said display generator.

3. The system as set forth in claim 1 wherein said signal transmission means is a coherent fiber optic bundle for transmitting optical signals from said display generator to a display within said image source wherein said optical signal is projected by a reticle projector onto said combiner means.

* * * * *